United States Patent
Kleber et al.

(10) Patent No.: US 9,463,665 B2
(45) Date of Patent: Oct. 11, 2016

(54) WHEEL ASSEMBLY AND CORROSION BARRIER FOR SAME

(75) Inventors: Richard M. Kleber, Clarkston, MI (US); Ravi Verma, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 743 days.

(21) Appl. No.: 12/135,458

(22) Filed: Jun. 9, 2008

(65) Prior Publication Data

US 2008/0309151 A1 Dec. 18, 2008

Related U.S. Application Data

(60) Provisional application No. 60/943,652, filed on Jun. 13, 2007.

(51) Int. Cl.
*B60B 3/16* (2006.01)
*B60B 3/14* (2006.01)
*B60B 3/02* (2006.01)

(52) U.S. Cl.
CPC ............... *B60B 3/16* (2013.01); *B60B 3/145* (2013.01); *B60B 3/02* (2013.01)

(58) Field of Classification Search
CPC ............ B60B 3/02; B60B 3/145; B60B 3/16
USPC ............ 301/35.621, 35.625, 35.626, 35.627, 301/35.629, 35.632, 63.101, 63.106, 301/64.301, 6.91
See application file for complete search history.

(56) References Cited

U.S. PATENT DOCUMENTS

| 1,769,903 | A | * | 7/1930 | Baker | 301/36.1 |
| 1,818,448 | A | * | 8/1931 | Baker | 301/6.91 |
| 4,900,097 | A | * | 2/1990 | Kostov et al. | 301/64.702 |
| 5,026,122 | A | * | 6/1991 | Grubisic et al. | 301/35.625 |
| 5,454,628 | A | | 10/1995 | Maiworm et al. | |
| 6,106,077 | A | | 8/2000 | Kluge et al. | |
| 6,296,319 | B1 | | 10/2001 | Hummel et al. | |
| 6,796,406 | B1 | * | 9/2004 | Yunes | 188/218 A |
| 7,290,838 | B2 | * | 11/2007 | Handa et al. | 301/63.103 |
| 2001/0048241 | A1 | | 12/2001 | Yoshimura | |
| 2002/0117888 | A1 | | 8/2002 | Wurft | |
| 2003/0067210 | A1 | * | 4/2003 | Fielden | 301/35.621 |
| 2005/0067229 | A1 | | 3/2005 | Gabourie | |
| 2005/0184578 | A1 | | 8/2005 | Fielden | |

FOREIGN PATENT DOCUMENTS

DE 4306484 C1 * 4/1994
JP 10278502 A * 10/1998

OTHER PUBLICATIONS

Machine Translation of JP 10278502 A.*
U.S. Appl. No. 12/267,776, Luo et al., Lightweight Aluminum Wheel with Magnesium Rim, filed Nov. 10, 2008.

* cited by examiner

*Primary Examiner* — Kip T Kotter
(74) *Attorney, Agent, or Firm* — BrooksGroup

(57) ABSTRACT

A wheel barrier assembly is disclosed for creating a physical barrier between a wheel hub, a wheel and a plurality of lugs securing the wheel to the wheel hub. The wheel barrier assembly may include a plate extending between the wheel hub and the wheel to insulate the wheel from the wheel hub. The wheel barrier assembly may also include a plurality of collets extending through the wheel and secured to the plate to insulate the wheel from the lugs.

14 Claims, 2 Drawing Sheets

WHEEL ASSEMBLY AND CORROSION BARRIER FOR SAME

This application claims the benefit of U.S. Provisional Application No. 60/943,652, filed Jun. 13, 2007.

TECHNICAL FIELD

The field to which the disclosure generally relates includes wheels used with motor vehicles. More specifically, the invention relates to wheels having a barrier to prevent the wheels from corroding.

BACKGROUND

Alloy road wheels with high magnesium content are not uncommon on specialty and racing vehicles. The use of the wheels in less expensive passenger vehicles has, however, been limited to a few production sports cars. Galvanic corrosion is a design consideration in high magnesium content alloy wheels when mated to steel or cast iron wheel hub and brake components. These components spend much of their service life in wet conditions, often with road salt, which accelerates the galvanic reaction.

SUMMARY OF EXEMPLARY EMBODIMENTS OF THE INVENTION

One embodiment of the invention may include a wheel barrier assembly for creating a physical barrier between a wheel hub, a wheel and a plurality of lugs securing the wheel to the wheel hub. The wheel barrier assembly may include a plate extending between the wheel hub and the wheel to insulate the wheel from the wheel hub. The wheel barrier assembly may also include a plurality of collets secured to the plate and extending through the wheel to insulate the wheel from the lugs.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
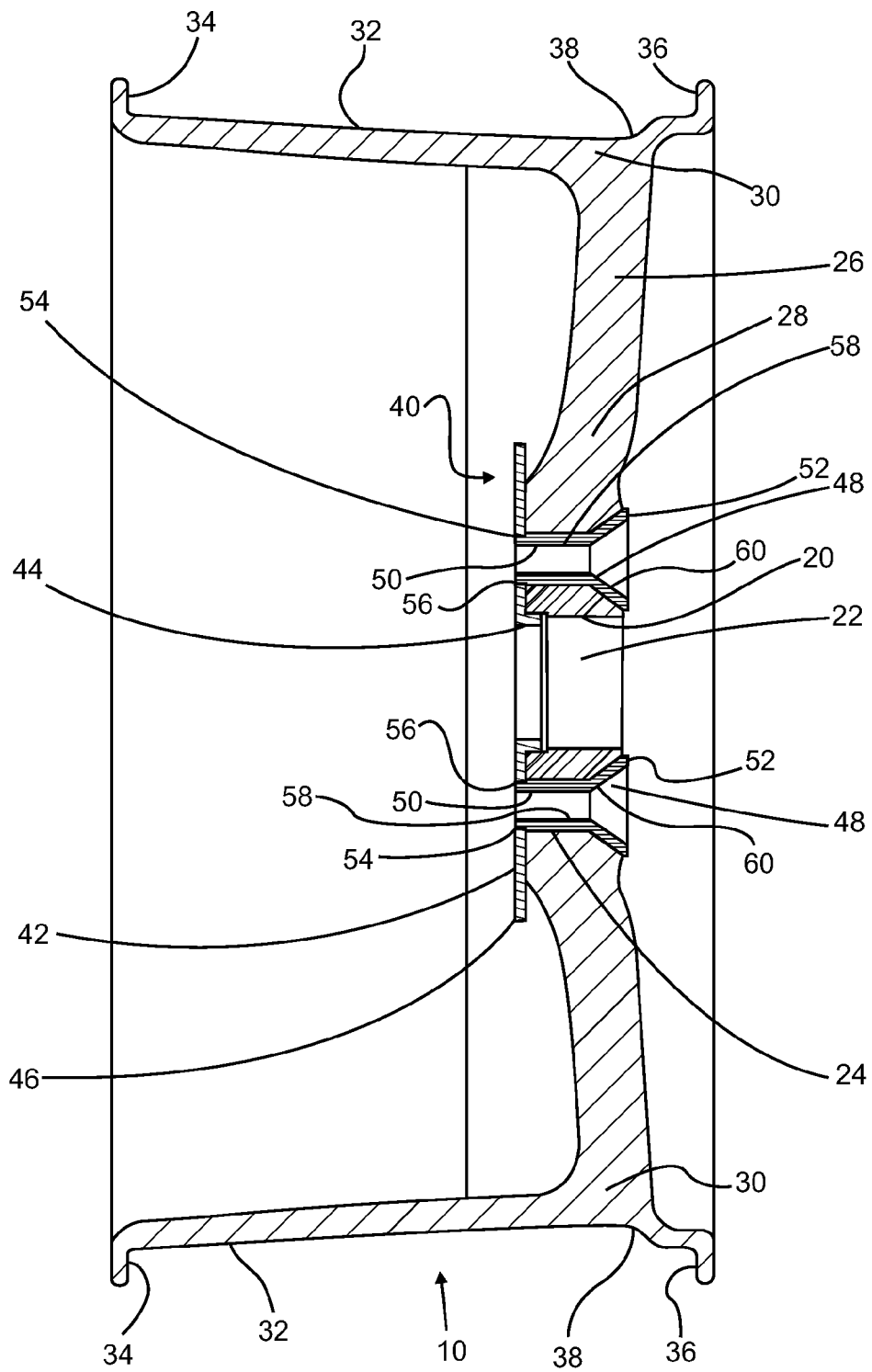
FIG. 1 is a cross-sectional side view of one embodiment of the invention.
Figure 2:
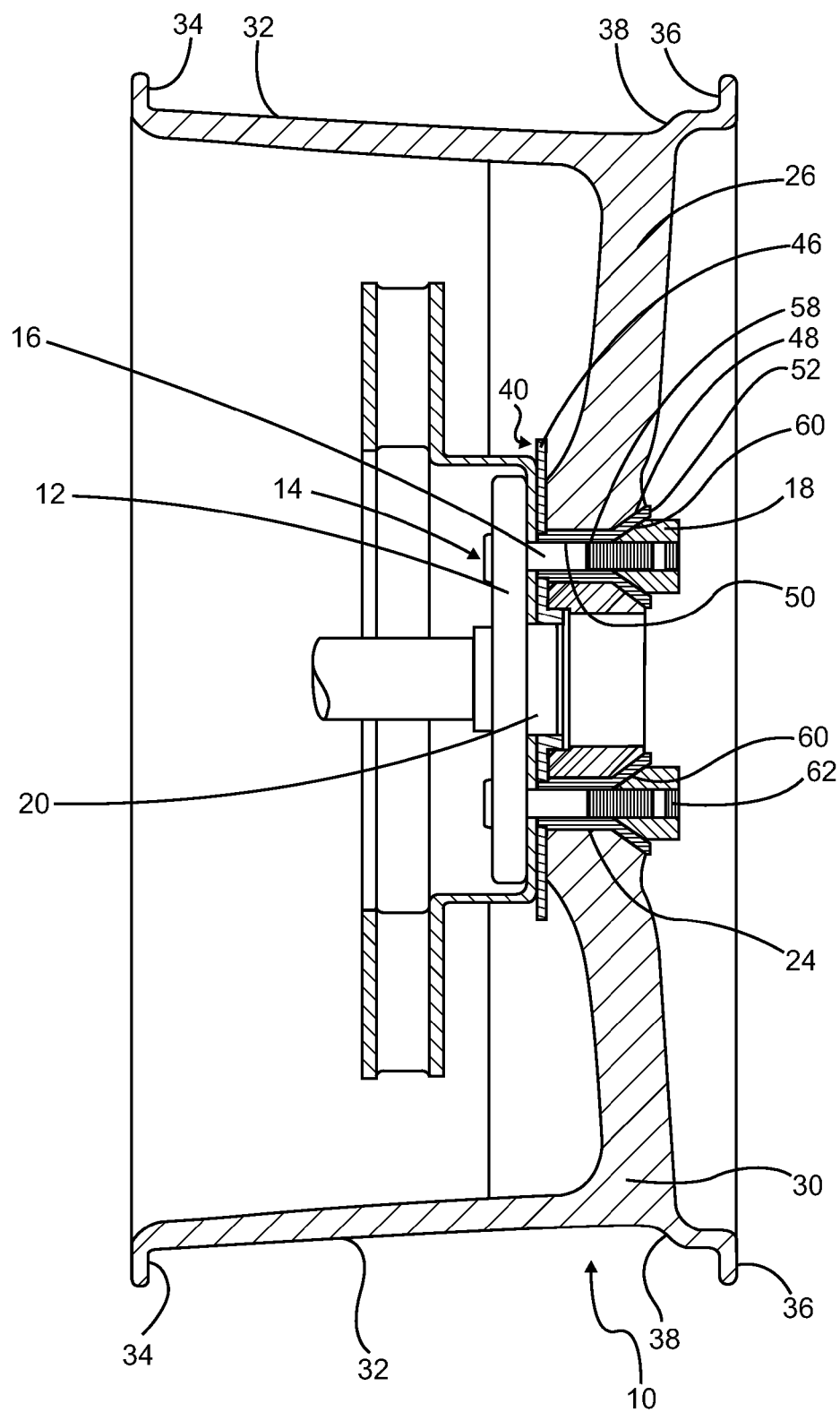
FIG. 2 is a cross-sectional side view of one embodiment of the invention mounted to a wheel hub, shown in partial cross-section.

Referring to FIG. 1, one embodiment of the invention may include a wheel assembly generally indicated at 10. The wheel assembly 10 is removably securable to a wheel hub 12 (FIG. 2) with a plurality of lugs 14 (FIG. 2). In the embodiment shown in FIG. 2, the lugs 14 are lug bolts 16 and lug nuts 18. It should be appreciated by those skilled in the art that the lugs 14 may be replaced with other styles of securing devices such as lug studs and the like.

Returning attention to FIG. 1, the wheel assembly 10 may include a hub receiving center 20 that defines a hub hole 22. The hub receiving center 20 typically receives the wheel hub 12 (FIG. 2), wherein the hub receiving center 20 and the wheel hub 12 are coaxial and concentric. The hub receiving center 20 also defines a plurality of lug holes 24, wherein each one of the plurality of lug holes 24 individually receives an associated lug 14 therein (FIG. 2). Typically, the plurality of lug holes 24 are configured concentrically about the axis of the hub receiving center 20.

Extending out from the hub receiving center 20 is a disk 26. The disk 26 extends out from the hub receiving center 20 and is concentric therewith. The disk 26 may be referred to as a spider as the disk may have several cut outs extending therethrough. It should be appreciated by those skilled in the art that the disk 26 may have several possible designs extending from its inner periphery 28 and its outer periphery 30 in that many such designs are aesthetic in nature and merely design choices.

A rim 32 may be fixedly secured to the disk at the outer periphery 30 thereof. The rim 32 may be generally perpendicular to the disk 26. A tire (not shown) is seated on the rim 32. In one embodiment, the rim 32 and the disk 26 may be manufactured as a unitary structure, as in the construction of a magnesium wheel.

The rim may include an inboard flange 34 and an outboard flange 36. The tire beads may sit against the flanges 34, 36 to create a seal for the tire pressure. The rim 32 may also include a shallow wheel well 38, which is used for mounting tires to the wheel assembly 10.

A wheel barrier assembly, generally indicated at 40, may be fixedly secured to the hub receiving center 20 of the wheel assembly 10. The wheel barrier assembly 40 may create a physical barrier between the wheel hub 12, the wheel assembly 10, and the plurality of lugs 14 used to secure the wheel assembly 10 to the wheel hub 12. When the wheel assembly 10 is a magnesium wheel, the inner face between the magnesium and the iron or steel in the wheel hub 12 may create an environment that allows the magnesium to corrode. The wheel barrier assembly 40 includes a plate 42 that is designed to extend between the wheel hub 12 and the wheel assembly 10. The plate 42 insulates the wheel assembly 10 from the wheel hub 12 by creating a physical barrier therebetween. The plate 42 may include an inner ring 44 that may be press fit into the hub hole 22 of the wheel assembly 10. This press fit allows the plate 42 to be positioned concentrically with respect to the hub receiving center 20 of the wheel assembly 10. The inner ring 44 may extend up a portion of the hub hole 22. The plate 42 defines a plate outer periphery 46 or extension that may extend beyond the hub receiving center and, as such, the plate 42 defines a plate diameter that is greater than a predetermined diameter of the hub receiving center 20. The difference in diameters allows the plate 42 to further prevent the creation of a galvanic cell. Referring to FIG. 2, the plate outer periphery 46 or extension may extend in a radial outward direction (with respect to the generally cylindrically-shaped rim 32) for a distance beyond a confrontation region between the wheel hub 12 and the wheel assembly 10. The confrontation region may be defined as a region in which the respective surfaces of the wheel hub 12 and the wheel assembly 10 oppose each other by a shortest distance that separates the wheel hub and the wheel assembly. Still referring to FIG. 2, a free end portion of the plate outer periphery 46 does not make direct contact with the wheel hub 12 or the wheel assembly 10, which may further prevent the creation of a galvanic cell thereat. The free end portion may be defined by the terminal portion of the plate outer periphery 46 that extends in the radial outward direction (with respect to the generally cylindrically-shaped rim 32) beyond the confrontation region. The free end portion may be spaced from the wheel assembly 10 on an axial side (with respect to the generally cylindrically-shaped rim 32) of the free end portion, and may define a first space between the wheel assembly and the free end portion in the axial outboard direction; this too may further prevent the creation of a galvanic cell thereat.

The wheel barrier assembly 40 may also include a plurality of collets 48 that extend through the hub receiving center 20 of the wheel assembly 10 and are secured to the plate 42. The plurality of collets 48 may insulate the hub receiving center 20 from the lugs 14. Each of the plurality of collets 48 defines a lug end 50 and a hub end 52. The hub end 52 extends beyond the wheel assembly 10 when the plurality of collets 48 are placed into each of the lug holes 24 in the hub receiving center 20. In one embodiment the collets 48 are received in the lug holes 24 and press fit into the wheel. The lug end 50 defines a relief 54 which is engagable with each of a plurality of collet holes 56 in the plate 42. Each of the plurality of collets 48 may include a primary sleeve 58 and a secondary sleeve 60. The primary 58 and secondary 60 sleeves may be disposed adjacent one another. The primary sleeve 58 receives a threaded or neck portion 62 of the lugs 14. The secondary sleeve 60 receives the lug nut portion 18 of the lugs 14 therein to secure the collets 48 and the wheel assembly 10 to the wheel hub 12. Referring to FIG. 2, the lug ends 50 of each of the plurality of collets 48 may be located between the respective lug 14 and the respective lug hole 24 so that the lug bolts 16 of the lug and lug hole do not directly confront each other. Also, the hub ends 52 of each of the plurality of collets 48 may be located between the respective lug 14 and the hub receiving center 20 so that the lug and hub receiving center do not directly confront each other, so that the lug nut 18 of the lug and the inner periphery 28 or radial inner peripheral portion of the disk 26 do not directly confront each other, and so that each of the plurality of collets 48 extends farther in the axial outboard direction than an immediately adjacent surface of the disk 26 with respect to the respective lug nut 18 of the respective lug.

The wheel barrier assembly 40 may be fabricated from a metal such as aluminum. Other materials may be used to facilitate the creation of a barrier between the wheel assembly 10 and the wheel hub 12 so long as those materials are capable of withstanding the very hostile environment in which the wheel barrier assembly 40 is being placed.

The above description of embodiments of the invention is merely exemplary in nature and, thus, variations thereof are not to be regarded as a departure from the spirit and scope of the invention.

What is claimed is:

1. A wheel assembly removably securable to a wheel hub with a plurality of lugs, said wheel assembly comprising:

a hub receiving center including a hub hole and a plurality of lug holes, said hub receiving center defining a predetermined diameter;

a disk extending out from said hub receiving center;

a rim fixedly secured to said disk, said rim defining an inboard flange and an outboard flange;

a plate fixedly secured to said hub receiving center to create a barrier between said hub receiving center and the wheel hub, and a plurality of collets extending through each of said plurality of lug holes and secured to said plate to create a barrier between the lugs and said hub receiving center to prevent corrosion of said wheel assembly, wherein each of said plurality of collets is located between the respective lug and said respective lug hole so that a lug bolt of the lug and said lug hole do not directly confront each other, so that the lug and said hub receiving center do not directly confront each other, and wherein each of said plurality of collets extends farther in the axial outboard direction than an immediately adjacent surface of said disk with respect to a respective lug nut of the respective lug in order to prevent the creation of a galvanic cell thereat.

2. A wheel assembly as set forth in claim 1 wherein said plate defines a plate diameter greater than said predetermined diameter of said hub receiving center to prevent the creation of a galvanic cell.

3. A wheel assembly as set forth in claim 2 wherein said plate includes an inner ring matingly engagable with said hub hole.

4. A wheel assembly as set forth in claim 3 wherein each of said plurality of collets define a lug end and a hub end.

5. A wheel assembly as set forth in claim 4 wherein said hub ends extend beyond the wheel when said plurality of collets is press fit into the wheel.

6. A wheel assembly as set forth in claim 5 wherein each of said lug ends defines a relief engagable with said plate.

7. A wheel assembly as set forth in claim 6 wherein said plate includes a plurality of collet holes to receive each of said plurality of collets therein.

8. A wheel assembly as set forth in claim 7 wherein said plate comprises aluminum.

9. A wheel assembly as set forth in claim 8 wherein said plurality of collets comprise aluminum.

10. A wheel assembly as set forth in claim 9 wherein the disk comprises magnesium.

11. A wheel assembly as set forth in claim 1 wherein the disk comprises aluminum.

12. A wheel assembly as set forth in claim 1 wherein the rim comprises magnesium.

13. A wheel assembly as set forth in claim 1 wherein each of said plurality of collets comprises a primary sleeve and a secondary sleeve.

14. A wheel assembly as set forth in claim 13 wherein each of said plurality of lugs comprises a neck portion and lug nut portion, and wherein the primary sleeve is constructed and arranged to receive the neck portion of the lug, and wherein the secondary sleeve is constructed and arranged to receive the lug nut portion of the lug.

* * * * *